United States Patent [19]
Niwa

[11] Patent Number: 5,606,463
[45] Date of Patent: Feb. 25, 1997

[54] MAGNETIC RECORDING APPARATUS AND MAGNETIC REPRODUCING APPARATUS

[75] Inventor: Hirofumi Niwa, Yokohama, Japan

[73] Assignee: Canon Kabushiki Kaisha, Tokyo, Japan

[21] Appl. No.: 174,010

[22] Filed: Dec. 28, 1993

[30]     Foreign Application Priority Data

Dec. 28, 1992  [JP]  Japan ................................... 4-348673

[51] Int. Cl.⁶ ....................................................... H04N 5/78
[52] U.S. Cl. ................................. 386/68; 360/70; 360/75
[58] Field of Search ................................... 360/73.04, 70, 360/71, 72.3, 10.1, 10.2, 10.3, 35.1, 75, 14.1

[56]            References Cited

U.S. PATENT DOCUMENTS

| | | | |
|---|---|---|---|
| 4,161,002 | 7/1979 | Saito | 360/75 |
| 4,772,975 | 9/1988 | Azuma | 360/10.1 |
| 5,285,329 | 2/1994 | Takayama | 360/73.04 X |

*Primary Examiner*—Aristotelis Psitos
*Assistant Examiner*—Alan Faber
*Attorney, Agent, or Firm*—Fitzpatrick, Cella, Harper & Scinto

[57]            ABSTRACT

A magnetic recording and/or reproducing apparatus includes a rotating drum for conveying a magnetic recording medium and a magnetic head being mounted on the drum and kept in sliding contact with the magnetic recording medium. The magnetic head records signals on the recording medium in a recording mode and does not record signals on the recording medium in a recording pause mode. The magnetic head reproduces signals recorded on the recording medium in a motion picture reproducing mode and does not reproduce signals recorded on the recording medium in a still picture reproducing mode. The apparatus further includes a drum rotation control circuit for controlling the rotating speed of the drum. The drum is rotated at a lower speed during the recording pause mode than during the recording mode and is rotated at a lower speed during the still picture reproducing mode than during the motion picture reproducing mode. The lower speed of the drum is one of a constant speed, a decreasing ramp speed and an incrementally decreasing speed.

18 Claims, 6 Drawing Sheets

DRUM ROTATING SPEED OF FIRST EMBODIMENT

DRUM ROTATING SPEED OF OTHER EMBODIMENTS

MAGNETIC RECORDING APPARATUS AND MAGNETIC REPRODUCING APPARATUS

BACKGROUND OF THE INVENTION

1. Field of the Invention

The present invention relates to a magnetic recording apparatus and a magnetic reproducing apparatus in which a magnetic head mounted on a rotating drum slides on a magnetic recording medium to record and reproduce signals.

2. Prior Art

Hitherto, this type of magnetic reproducing apparatus has been generally constructed by having a magnetic tape wound about a magnetic head so that the magnetic head slides on the magnetic tape to record and reproduce signals, with the apparatus provided with the following modes: A recording mode in which video signals and the like are recorded on the magnetic tape; a motion picture reproducing mode in which video signals and the like recorded on the magnetic tape are reproduced; a fast forward mode in which the magnetic tape is fast fed without recording and reproducing signals; a rewinding mode in which the magnetic tape is rewound without recording and reproducing signals; a recording pause mode in which the recording operation is interrupted, with the magnetic head being kept in sliding contact on the magnetic recording medium; and a still picture reproducing mode in which a still picture is not directly reproduced from the magnetic tape, but from signals temporarily stored in a memory. The aforementioned memory has been constructed to temporarily store recorded signals which have been transmitted during the motion picture reproducing mode.

However, in the foregoing type of apparatus, in order to make immediate use of the specified recording functions when the recording pause mode is switched to the recording mode, the magnetic drum is rotated at the same speed during a recording pause mode as during a recording mode, with the magnetic head being kept in sliding contact on the magnetic tape.

In addition, in order to take immediate advantage of the specified motion picture reproducing functions when the still picture reproducing mode is switched to the motion picture reproducing mode, the drum is rotated at the same speed during a still picture reproducing mode as during a motion picture reproducing mode, with the magnetic head being kept in sliding contact on the magnetic tape.

That is, during both a recording pause mode and a still picture reproducing mode, the magnetic tape does not move and the magnetic head repeatedly slides on the same portion of the magnetic tape at a high speed, giving rise to problems such as seriously damaging magnetic tapes and seriously wearing magnetic heads.

To cope with increasing demands in recent years for high-density recording, high-speed magnetic heads, that is, high-speed rotation of drums, must be achieved in the future. However, high-speed rotation will make the above problems more serious.

SUMMARY OF THE INVENTION

Accordingly, it is an object of the invention to overcome the above problems of the prior art by providing a magnetic recording apparatus and a magnetic reproducing apparatus which, during a recording pause mode and a still picture reproducing mode, prevent, or at least reduce, damage to magnetic recording mediums and wearing of magnetic heads.

To these ends, according to one aspect of the present invention, there is provided a magnetic recording apparatus comprising a rotating drum for conveying a magnetic recording medium, a magnetic head being mounted on the drum and kept in sliding contact with the magnetic recording medium, the magnetic head recording signals on the recording medium in a recording mode and not recording signals on the recording medium in a recording pause mode and drum rotation control means for controlling the rotating speed of the drum, the control means controlling the rotating speed to rotate the drum at a lower speed during the recording pause mode than during the recording mode.

In the recording mode, the drum rotation control means controls the rotating speed of the drum on which the magnetic head is mounted, such that the drum is rotated at a predetermined recording mode rotating speed and the magnetic head slides on the magnetic recording medium to record signals. During the recording pause mode, the drum rotation control means rotates the drum at a lower speed than during the recording mode, and recording is interrupted while the magnetic head is kept in sliding contact with the magnetic recording medium. The lower speed of the drum during the recording pause mode is one of a constant speed, a decreasing ramp speed and an incrementally decreasing speed.

According to another aspect of the invention, there is provided a magnetic reproducing apparatus comprising a rotating drum for conveying a magnetic recording medium, a magnetic head being mounted on the drum and kept in sliding contact with the magnetic recording medium, the magnetic head reproducing signals recorded on the recording medium in a motion picture reproducing mode and not reproducing signals recorded in the recording medium in a still picture reproducing mode and drum rotation control means controlling the rotating speed of the drum, the control means controlling the rotating speed to rotate the drum at a lower speed during the still picture reproducing mode than during the motion picture reproducing mode.

During the motion picture reproducing mode, the drum rotation control means rotates the drum at a predetermined motion picture reproducing mode rotating speed and allows the magnetic head to slide on the magnetic head for reproducing a motion picture from the magnetic recording medium.

During the still picture reproducing mode, the drum rotation control means rotates the drum at a lower speed than during the motion picture reproducing mode and interrupts the reproduction of signals recorded on the magnetic recording medium, with the magnetic head being kept in sliding contact thereon, and reproducing still pictures from signals stored in the memory. The lower speed of the drum during the still picture reproducing mode is one of a constant speed, a decreasing ramp speed and an incrementally decreasing speed.

That is, during a recording pause mode or a still picture reproducing mode, even when the magnetic recording medium does not run and the magnetic head is made to slide on the same portion thereof, the magnetic head slides on the magnetic recording medium at a lower speed than during the recording mode or at a lower speed than during the motion picture reproducing mode. Accordingly, the number of times the magnetic head slides in the same amount of time is less compared to the number of times it slides during other modes, which prevents or at least reduces damage to magnetic recording mediums and wearing of magnetic heads.

According to yet another aspect of the invention, there is provided a recording and/or reproducing apparatus comprising a rotating drum including a recording and/or reproducing head for effecting at least one of recording of information on and reproducing of information from a recording medium, which is conveyed by the rotating drum, mode specifying means for specifying at least one operating mode selected from a plurality of recording modes and a plurality of reproducing modes and control means for controlling the rotating speed of the drum, in accordance with the operating mode specified by the mode specifying means. The mode specifying means specifies at least one of a recording mode, a reproducing mode and a recording pause mode, as the operating mode. The mode specifying means also specifies at least one of a motion picture reproducing mode and a still picture reproducing mode, as the operating mode. The control means rotates the drum at a lower speed during the recording pause mode than during the recording mode and at a lower speed during the still picture reproducing mode than during the reproducing mode. The lower speed of the drum is one of a constant speed, a decreasing ramp speed and an incrementally decreasing speed.

Other objects and features of the present invention will become apparent with reference to the following discussion and drawings.

DETAILED DESCRIPTION OF THE PREFERRED EMBODIMENT

The magnetic recording and/or reproducing apparatus of the present invention will be described below with reference to the preferred embodiments.

Figure 1:
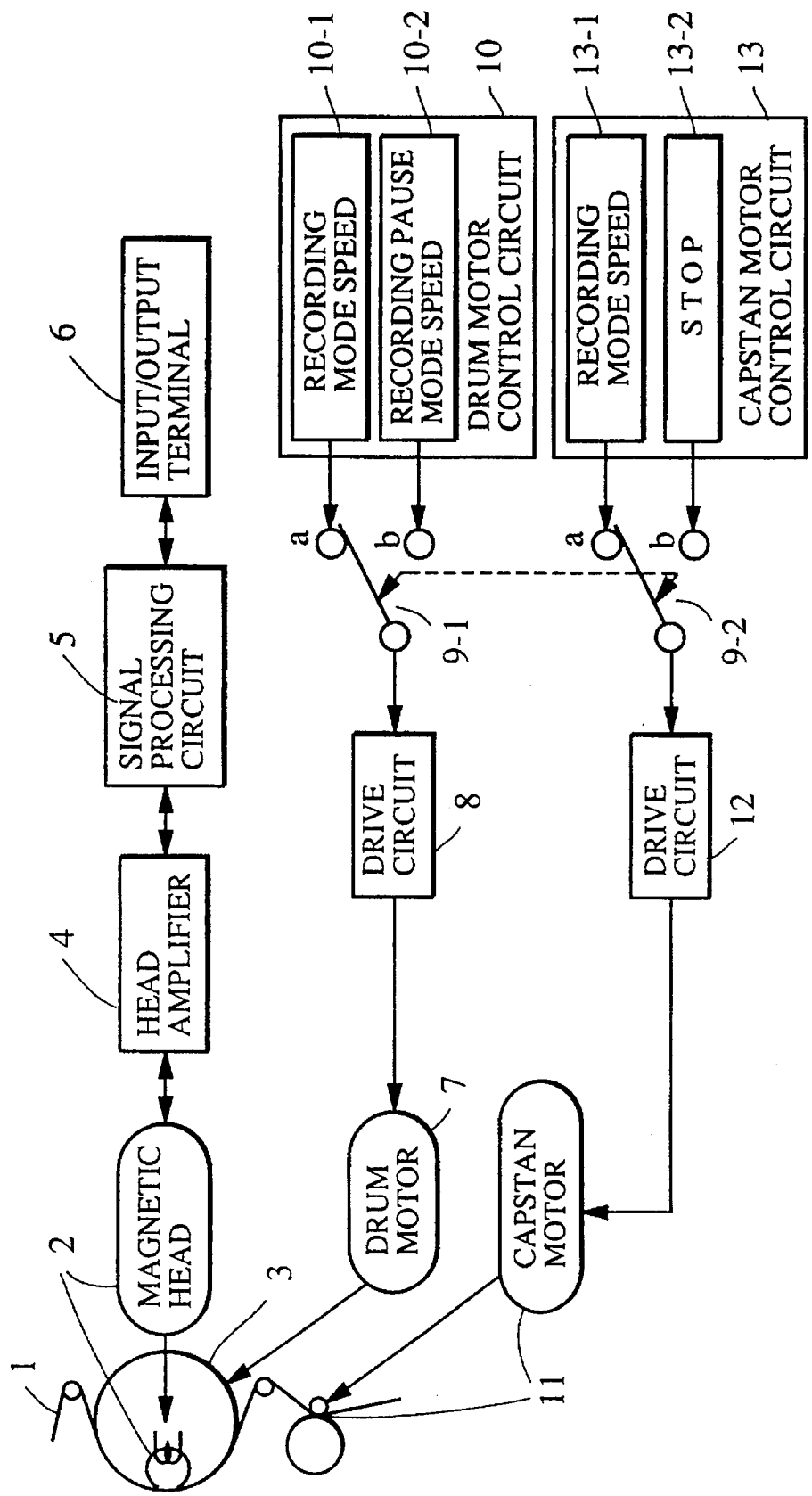
FIG. 1 is a block diagram showing a portion of a recording apparatus in accordance with a first aspect of the invention.

FIG. 1 is a block diagram showing the arrangement of a portion of a recording apparatus in accordance with a first aspect of the present invention, with the portion related to reproduction omitted.

Referring to FIG. 1, reference numeral 1 denotes a magnetic tape for recording and reproducing magnetic signals; reference numeral 2 denotes a magnetic head for recording and reproducing signals on the magnetic tape 1; reference numeral 3 denotes a drum provided with the magnetic head 2 rotating at a predetermined speed; reference numeral 4 denotes a head amplifier which amplifies recorded and reproduced signals; reference numeral 5 denotes a signal processing circuit which converts video signals to recorded signals and recorded signals back to video signals; reference numeral 6 denotes an input/output terminal for signal input and output; reference numeral 7 denotes a drum motor for rotating the drum 3; reference numeral 8 denotes a drive circuit for controlling the drum motor 7; reference numerals 9-1 and 9-2 each denote a change-over switch which interlocks for operation, with 9-1 being a switch for switching the rotating speed of the drum motor 7 and 9-2 being a switch for switching the rotating speed of capstan motor 11; reference numeral 10 generally denotes a control circuit for the drum motor, which includes circuit 10-1 used for a recording mode and circuit 10-2 used for a recording pause mode; reference numeral 11 denotes a capstan motor for moving the magnetic tape 1; reference numeral 12 denotes a drive circuit for controlling the capstan motor 11; reference numeral 13 generally denotes a control circuit for controlling the capstan motor 11, which includes a circuit 13-1 used for the recording mode and a circuit 13-2 used for the recording pause mode, which is more specifically for stop control.

Figure 2:
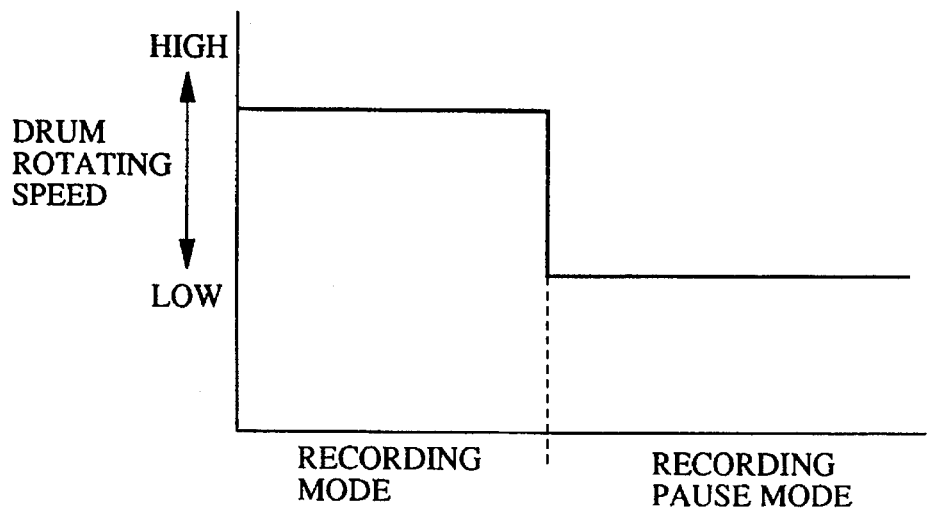
FIG. 2 is a graph showing the rotating speed of the drum of the recording apparatus in accordance with the first aspect of the invention.

FIG. 2 is a graph showing the rotating speed of the drum 3 controlled by the drum motor control circuit 10 during a recording mode and a recording pause mode.

In the above-described arrangement, in the recording mode switches 9-1 and 9-2 are connected to side a as shown in FIG. 1, and the drum motor 7 and the capstan motor 11 each rotate at the predetermined speed. In addition, signals input by input/output terminal 6 are recorded on the magnetic tape 1 by means of the magnetic head 2 mounted on the drum 3 by way of the signal processing circuit 5 and the head amplifier 4.

Next, in the recording pause mode, switches 9-1 and 9-2 switch to side b as shown in FIG. 1.

As a result, the capstan motor 11 stops, and the drum does not rotate at the same speed as it rotated during the recording pause mode, as shown in FIG. 2.

That is, as shown in FIG. 2, the drum 3 in the recording pause mode of the recording apparatus in accordance with the first aspect of the present invention is set to rotate at a lower speed than during the recording mode, reducing the possibility of damage to and wearing of the magnetic tape 1 and the magnetic head 2.

Figure 3:
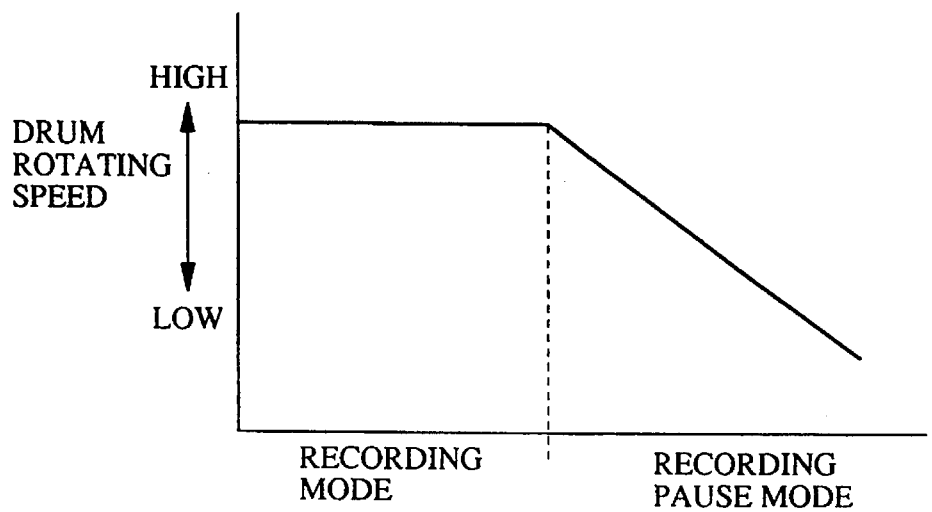
FIG. 3 is a graph showing the rotating speed of the drum of an embodiment of the recording apparatus.
Figure 4:
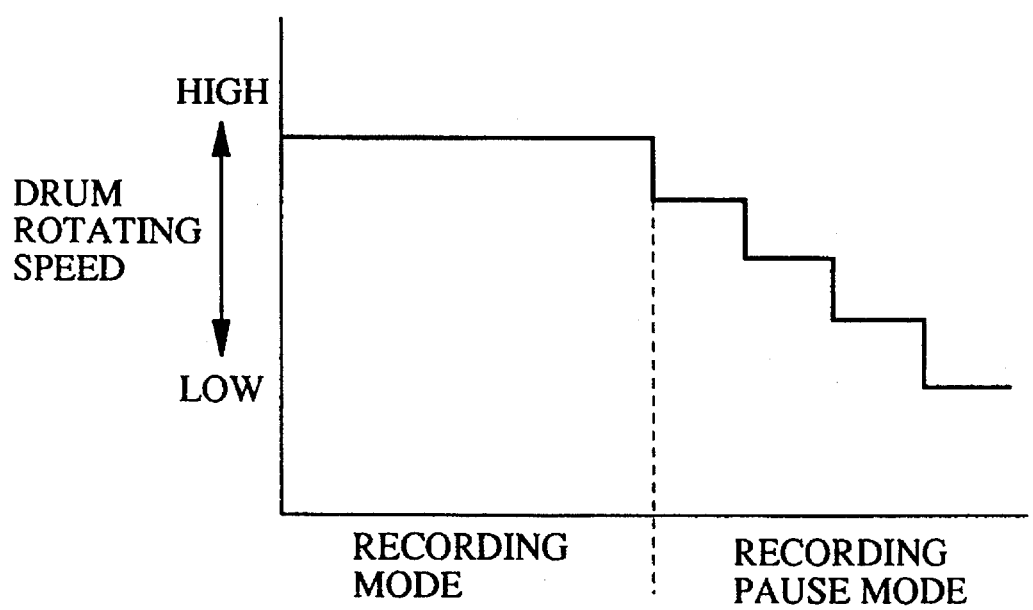
FIG. 4 is a graph showing the rotating speed of the drum of another embodiment of the recording apparatus.

In the above-described recording apparatus in accordance with the first aspect, the rotating speed of the drum 3 in the recording pause mode is varied in a binary manner. However, as in other embodiments shown in FIGS. 3 and 4, respectively, the rotating speed of the drum 3 can be gradually reduced or reduced stepwise, with the same effects obtained as with a recording apparatus in accordance with the first aspect.

Figure 5:
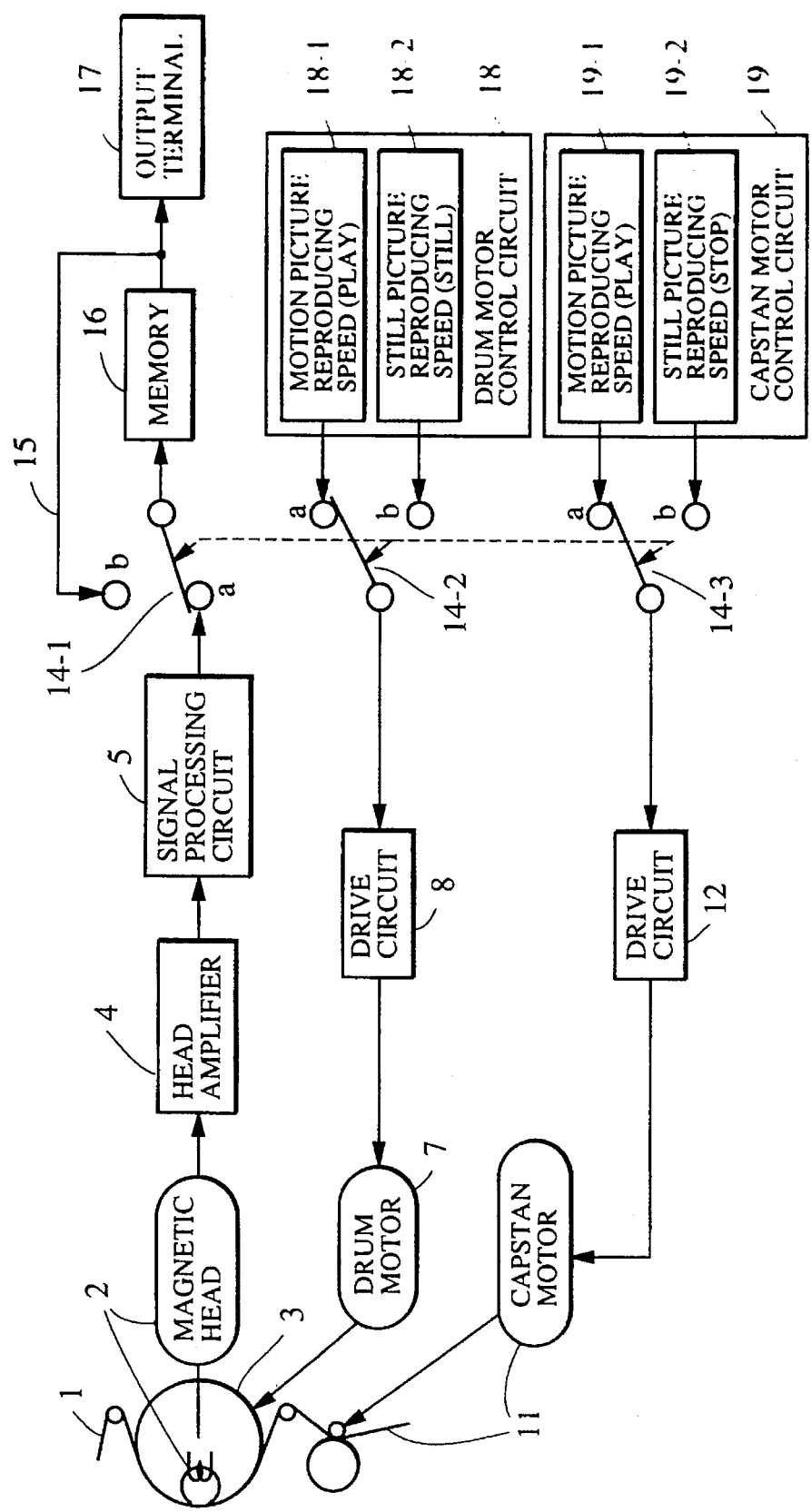
FIG. 5 is a block diagram showing a portion of a reproducing apparatus in accordance with a second aspect of the invention.

FIG. 5 is a block diagram showing the arrangement of a portion of a reproducing apparatus in accordance with a second aspect of the present invention, with the portion related to recording not shown. Like or corresponding parts to those of the recording apparatus in accordance with the first aspect are designated using the same reference numerals.

Referring to FIG. 5, reference numeral 1 denotes a magnetic tape on which magnetic signals have been recorded; reference numeral 2 denotes a magnetic head for reproducing signals recorded on the magnetic tape 1; reference numeral 3 denotes a drum provided with a magnetic head 2 which rotates at a predetermined speed; reference numeral 4 denotes a head amplifier which amplifies signals reproduced by the magnetic head 2; reference numeral 5 denotes a signal processing circuit which converts amplified reproduced signals into video signals; reference numeral 7 denotes a drum motor for rotating the drum 3; reference numeral 8 denotes a drive circuit for controlling the drum motor 7; reference numeral 11 denotes a capstan motor which runs the magnetic tape 1; reference numeral 12 denotes a drive circuit for the capstan motor 11; and reference numerals 14-1, 14-2, and 14-3 each denote a switch which interlocks for operation, with switch 14-1 being used for controlling reproducing operations, switch 14-2 being used for switching signals input during a still picture reproducing (still) mode and a motion picture reproducing (play) mode, switch 14-2 being used for switching the rotating speed of the drum motor 7, and switch 14-3 being used for switching the rotating speed of the capstan motor 11; reference numeral 16 denotes a memory for accumulating video signals; reference numeral 15 denotes a feedback path for re-inputting video signals output from the memory 16 back to the memory 16; reference numeral 17 denotes an output terminal which outputs video signals input to, for example, a television monitor; and reference numeral 18 generally denotes a control circuit for controlling the drum motor 7, which includes a circuit 18-1 used for a motion picture reproducing (play) mode and a circuit 18-2 used for a still picture reproducing (still) mode; reference numeral 19 generally denotes a control circuit for controlling the capstan motor 11, which includes a circuit 19-1 used for a motion picture reproducing (play) mode and a circuit 19-2 used for a still picture reproducing (still) mode, and more specifically, for stop control.

Figure 6:
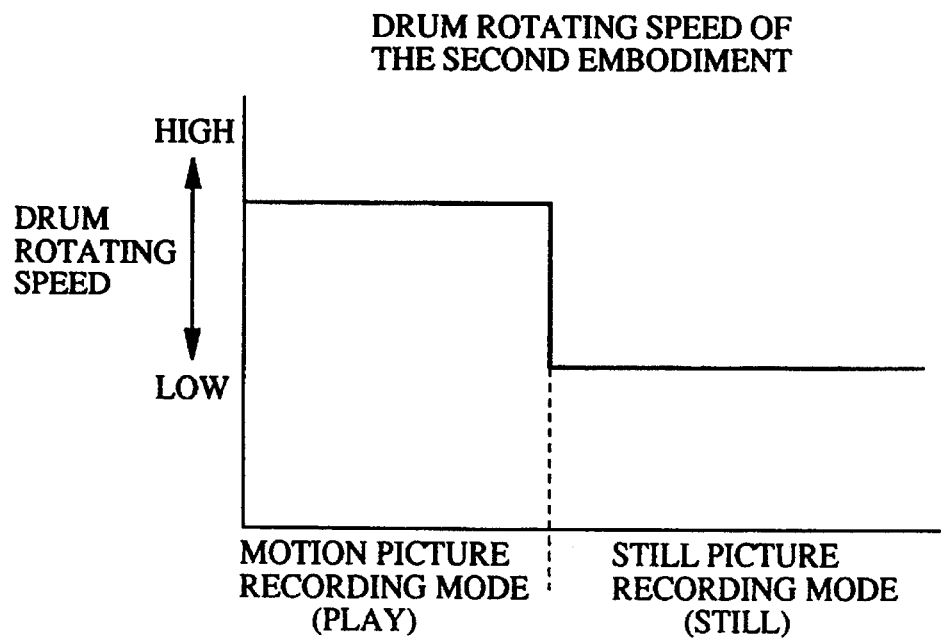
FIG. 6 is a graph showing the rotating speed of the drum of the reproducing apparatus in accordance with the second aspect of the invention.

FIG. 6 is a graph showing the rotating speed of the drum 3 during a still picture reproducing (still) mode and a motion picture reproducing (play) mode.

Referring to the arrangement of the foregoing reproducing apparatus in accordance with the second aspect, in the motion picture reproducing (play) mode switches, 14-1, 14-2, and 14-3 are connected to side a shown in FIG. 5, and the drum motor 7 and the capstan motor 11 each rotates at a predetermined speed, so that signals recorded on the magnetic tape 1 are reproduced by the magnetic head 2 mounted on the drum 3 and converted into video signals by the head amplifier 4 and the signal processing circuit 5, after which the converted signals, which have reached the output terminal by way of the memory 16, are output to, for example, a television monitor.

Next, during the still picture reproducing (still) mode, switches 14-1, 14-2, and 14-3 each switches to side b shown in FIG. 5, causing the capstan motor 11 to stop. Just before switch 14-1 switches to side b, the video signals sent from the signal processing section 5 to the memory 16 reach the output terminal 17, which at the same time pass the feedback path 15 and reenter the memory 16, this operation loop being indefinitely repeated until the mode ends.

For this reason, in the still picture reproducing (still) mode, it is not necessary for the magnetic head 2 to reproduce signals recorded on the magnetic tape 1 and for the drum 3 to continue rotating at the speed that it rotates during the motion picture reproducing (play) mode.

In this reproducing apparatus, as shown in FIG. 6, which indicates the rotating speed of the drum set for the still picture reproducing (still) mode, the rotating speed, which is set at a lower speed than during the motion picture reproducing (play) mode, can reduce damage to and wearing of the magnetic tape 1 and the magnetic head 2.

Figure 7:
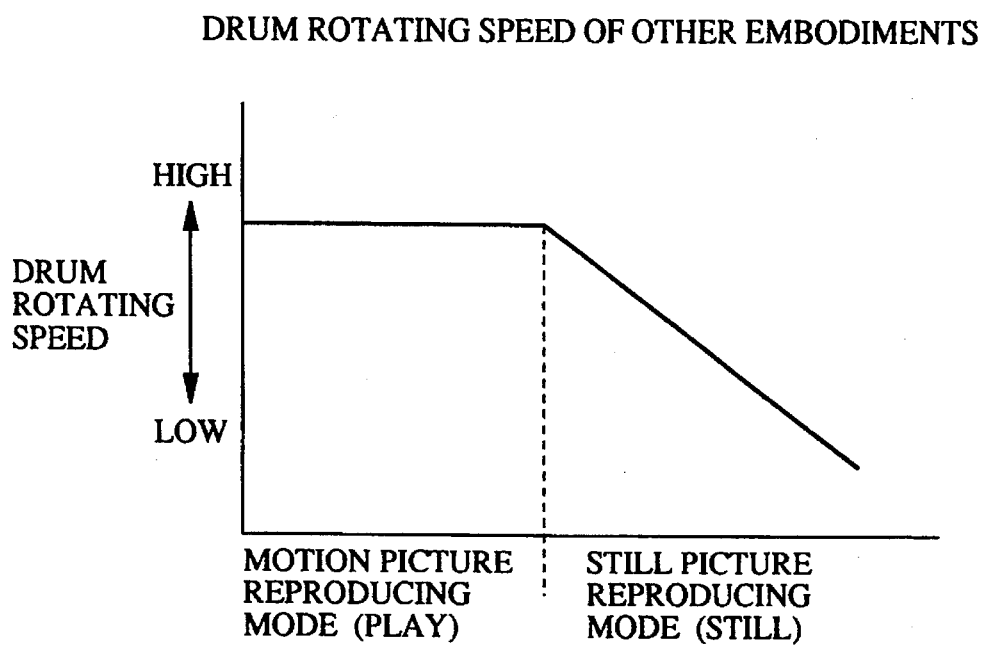
FIG. 7 is a graph showing the rotating speed of the drum of an embodiment of the reproducing apparatus.
Figure 8:
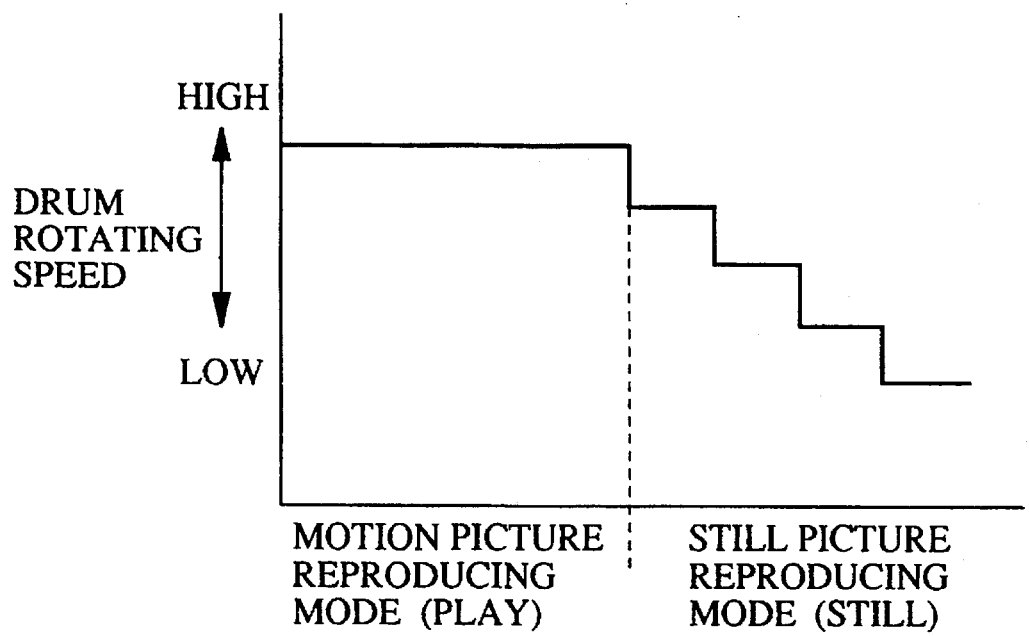
FIG. 8 is a graph showing the rotating speed of the drum of another embodiment of the reproducing apparatus.

In the above-described reproducing apparatus of the second aspect of the present invention, the rotating speed of the drum during the still picture reproducing (still) mode has only been changed in a binary manner. However, as in other embodiments shown in FIGS. 7 and 8, respectively, the rotating speed of drum 3 can be reduced gradually or stepwise, with the same effects as those obtained in the reproducing apparatus in accordance with the second aspect.

As described above, according to the magnetic recording apparatuses of the present invention, during a recording pause mode, the drum rotation control means, which controls the rotating speed of the drum having a magnetic head, rotates the drum at a lower speed than during a recording mode and interrupts the recording of signals while the magnetic head is kept in sliding contact with the magnetic recording medium.

According to the magnetic reproducing apparatuses of the present invention, during a still picture reproducing mode, the drum is rotated by the drum rotation control means at a lower speed than during a still picture reproducing mode, interrupting the reproduction of signals recorded on the magnetic recording medium with the magnetic head kept in sliding contact on the magnetic recording medium to reproduce still pictures from signals recorded in the memory.

That is, in the magnetic recording apparatuses and magnetic reproducing apparatuses of the present invention, during the recording pause mode or the still picture recording mode, the magnetic head and the magnetic recording medium slide at a lower speed than they rotate during the recording mode or during the motion picture reproducing mode, respectively, even when the magnetic recording medium does not run and the magnetic head slides on the same portion thereon; in other words, the number of times the head and medium slide against each other is less for the same length of time, thereby preventing, or at least reducing, damage to the magnetic recording medium and wearing of the magnetic head.

In the above-described apparatuses of the invention, in order to switch the still picture reproducing mode or recording pause mode back to the usual reproducing or recording mode, a greater torque than usual is quickly applied to the foregoing drum motor, so that it immediately rotates at the predetermined speed.

Except as otherwise disclosed herein, the various components shown in outline or in block form in the figures are individually well known in this art and their internal construction and operation are not critical either to the making or using of this invention or to a description of the best mode of the invention.

While the present invention has been described with respect to what is at present considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A magnetic reproducing apparatus comprising:

a rotating drum for conveying a magnetic recording medium;

a magnetic head being mounted on said drum and kept in sliding contact with the magnetic recording medium, said magnetic head reproducing signals recorded on the recording medium in a motion picture reproducing mode and not reproducing signals recorded in the recording medium in a still picture reproducing mode in which still pictures are reproduced; and drum rotation control means controlling the rotating speed of the drum, said control means controlling the rotating speed to rotate the drum at a lower speed during the still picture reproducing mode than during the motion picture reproducing mode.

2. An apparatus according to claim 1, further comprising means for reproducing still pictures stored in a memory during the still picture reproducing mode.

3. An apparatus according to claim 1, wherein the lower speed of said drum during the still picture reproducing mode is one of a constant speed, a decreasing ramp speed and an incrementally decreasing speed.

4. A recording and/or reproducing apparatus comprising:
   a rotating drum including a recording and/or reproducing head for effecting at least one of recording of information on and reproducing of information from a magnetic recording medium, which is conveyed by said rotating drum;
   mode specifying means for specifying at least one operating mode selected from a plurality of recording modes and a plurality of reproducing modes, wherein said mode specifying means specifies at least one of a motion picture reproducing mode and a still picture reproducing mode, as the operating mode; and
   control means for controlling the rotating speed of said rotating drum by causing the rotating speed to decrease gradually and to increase immediately, in accordance with the operating mode specified by said mode specifying means.

5. An apparatus according to claim 4, wherein said control means gradually changes the rotating speed of said drum when said mode specifying means changes operating modes.

6. An apparatus according to claim 4, wherein said mode specifying means specifies at least one of a recording mode, a reproducing mode and a recording pause mode, as the operating mode.

7. An apparatus according to claim 6, wherein said control means rotates said drum at a lower speed during the recording pause mode than during the recording mode.

8. An apparatus according to claim 7, wherein the lower speed of said drum is one of a constant speed, a decreasing ramp speed and an incrementally decreasing speed.

9. An apparatus according to claim 4, wherein said control means rotates said drum at a lower speed during the still picture reproducing mode than during the reproducing mode.

10. An apparatus according to claim 9, wherein the lower speed of said drum is one of a constant speed, a decreasing ramp speed and an incrementally decreasing speed.

11. A reproducing apparatus comprising:
    reproducing means for reproducing image signals from a recording medium, said reproducing means comprising a rotary head for tracing the recording medium to pick up the image signals from the recording medium; and
    transporting means for transporting the recording medium,
    wherein said apparatus operates in a plurality of modes, including (i) a motion picture reproducing mode in which said transporting means transports the recording means, the rotary head rotates at a first rotating speed and motion pictures are reproduced and (ii) a still picture reproducing mode in which said transporting means stops transporting the recording medium, the rotary head rotates at a second rotating speed, lower than the first speed, and still pictures are reproduced.

12. An apparatus according to claim 11, further comprising control means for controlling the rotating speed of the rotary head.

13. An apparatus according to claim 12, wherein said reproducing means comprises a rotary drum mounted with the rotary head and a drive circuit for driving the rotary drum, and said control means controls the drive circuit to change the rotary speed of the rotary head.

14. An apparatus according to claim 12, further comprising mode changing means for changing the mode of said apparatus between the motion picture reproducing mode and the still picture reproducing mode, wherein said control means changes the rotating speed of the rotary head from the first speed to the second speed in response to said mode changing means changing the mode from the motion picture reproducing mode to the still picture reproducing mode.

15. An apparatus according to claim 11, further comprising signal processing means for processing the image signals reproduced by said reproducing meads to obtain reproduced image signals.

16. An apparatus according to claim 15, wherein the motion pictures are reproduced using the reproduced image signals obtained by said signal processing means in the motion picture reproducing mode.

17. An apparatus according to claim 15, further comprising a memory for storing the reproduced image signals, wherein the image signals are repeatedly read out from said memory in the still picture reproducing mode to reproduce the still pictures.

18. A reproducing apparatus comprising:
    reproducing means for reproducing image signals from a recording medium, said reproducing means comprising a rotary head for tracing the recording medium to pick up the image signals from the recording medium;
    transporting means for transporting the recording medium;
    setting means for instructing reproduction of a still picture; and
    control means for controlling a rotating speed of the rotary head and a transporting operation of said transporting means, said control means stopping transporting of the recording medium by said transporting means and said control means changing the rotating speed of the rotary head from a first speed to a second speed, lower than the first speed, in response to said setting means instructing the reproduction of a still picture.

* * * * *

UNITED STATES PATENT AND TRADEMARK OFFICE
CERTIFICATE OF CORRECTION

PATENT NO. : 5,606,463
DATED : February 25, 1997
INVENTOR(S) : HIROFUMI NIWA

It is certified that error appears in the above-indentified patent and that said Letters Patent is hereby corrected as shown below:

COLUMN 6

Line 60, "conveying" should read --guiding--.

COLUMN 7

Line 19, "conveyed" should read --guided--.

COLUMN 8

Line 4, "means," should read --medium,--.
    Line 28, "meads" should read --means--.

Signed and Sealed this

Sixteenth Day of September, 1997

Attest:

BRUCE LEHMAN

*Attesting Officer*    *Commissioner of Patents and Trademarks*